US011165590B2

(12) United States Patent
Butler et al.

(10) Patent No.: US 11,165,590 B2
(45) Date of Patent: *Nov. 2, 2021

(54) DECENTRALIZED BIOMETRIC SIGNING OF DIGITAL CONTRACTS

(71) Applicant: International Business Machines Corporation, Armonk, NY (US)

(72) Inventors: Anthony M. Butler, Dubai (AE); Ghada Dulaim, Dubai (AE); Victor Usobiaga, Dubai (AE)

(73) Assignee: International Business Machines Corporation, Armonk, NY (US)

(*) Notice: Subject to any disclaimer, the term of this patent is extended or adjusted under 35 U.S.C. 154(b) by 198 days.

This patent is subject to a terminal disclaimer.

(21) Appl. No.: 16/686,428

(22) Filed: Nov. 18, 2019

(65) Prior Publication Data
US 2020/0084047 A1    Mar. 12, 2020

Related U.S. Application Data

(63) Continuation of application No. 15/491,285, filed on Apr. 19, 2017, now Pat. No. 10,541,818.

(51) Int. Cl.
*H04L 9/32* (2006.01)
*H04L 29/06* (2006.01)
(Continued)

(52) U.S. Cl.
CPC ......... *H04L 9/3247* (2013.01); *G06Q 50/18* (2013.01); *H04L 9/3231* (2013.01);
(Continued)

(58) Field of Classification Search
CPC . H04L 9/3247; H04L 63/0861; H04L 9/3231; H04L 9/3236; H04L 2209/38;
(Continued)

(56) References Cited

U.S. PATENT DOCUMENTS 6,601,172 B1    7/2003  Epstein
6,925,182 B1    8/2005  Epstein
(Continued)

FOREIGN PATENT DOCUMENTS

JP      2015-154491     8/2015
KR  10-2014-0073600     6/2014

OTHER PUBLICATIONS

Biometric Certificate Based Biometric Digital Key Generation with Protection Mechanism, Chung et al, 2007 (Year: 2007).*
(Continued)

*Primary Examiner* — Jahangir Kabir
(74) *Attorney, Agent, or Firm* — Schmeiser, Olsen & Watts, LLP; William Hartwell

(57) ABSTRACT

A method and system for decentralized biometric signing of a digital contract. A private key is encrypted using biometric data captured, from a user, on a mobile device. The encrypted private key, a public key associated with the private key, and a digital identity pertaining to the user and the captured biometric data are stored on the mobile device. A digital hash of the digital contract is generated. Using the captured biometric data, the user is authenticated and the encrypted private key is decrypted. The digital hash is signed with the decrypted private key. The signed digital hash of the digital contract, the digital contract prior to being hashed, the identifier, the certifier of the identifier, the public key, a certification of the public key by a third party, and a record of a successful authentication of the user using the biometric data are stored in a blockchain.

20 Claims, 7 Drawing Sheets

(51) Int. Cl.
*H04W 12/06* (2021.01)
*G06Q 50/18* (2012.01)
*H04W 12/02* (2009.01)
*H04W 12/033* (2021.01)
*H04W 12/065* (2021.01)
*H04W 12/069* (2021.01)

(52) U.S. Cl.
CPC ........ *H04L 9/3236* (2013.01); *H04L 63/0861* (2013.01); *H04W 12/02* (2013.01); *H04W 12/033* (2021.01); *H04W 12/065* (2021.01); *H04W 12/068* (2021.01); *H04W 12/069* (2021.01); *H04L 2209/38* (2013.01)

(58) Field of Classification Search
CPC ............. H04W 12/033; H04W 12/065; H04W 12/068; H04W 12/069; H04W 12/02; G06Q 50/18
USPC ................................................. 713/175–177
See application file for complete search history.

(56) References Cited

U.S. PATENT DOCUMENTS

| | | | |
|---|---|---|---|
| 8,406,428 B2 * | 3/2013 | Bauchot | ............... H04L 9/3231 380/282 |
| 9,331,856 B1 | 5/2016 | Song | |
| 10,277,400 B1 | 4/2019 | Griffin et al. | |
| 10,805,089 B1 * | 10/2020 | Yu | ....................... G06F 21/6218 |
| 2007/0106895 A1 | 5/2007 | Huang et al. | |
| 2015/0199502 A1 | 7/2015 | Chen et al. | |
| 2015/0200935 A1 | 7/2015 | Ikeda et al. | |
| 2015/0244690 A1 | 8/2015 | Mossbarger | |
| 2015/0356523 A1 | 12/2015 | Madden | |
| 2016/0164684 A1 | 6/2016 | Owlett et al. | |
| 2016/0234026 A1 | 8/2016 | Wilkins et al. | |
| 2016/0269184 A1 | 9/2016 | VanBlon et al. | |
| 2016/0283920 A1 | 9/2016 | Fisher et al. | |
| 2016/0330027 A1 * | 11/2016 | Ebrahimi | ............... G06Q 20/02 |
| 2017/0085562 A1 * | 3/2017 | Schultz | ............... H04L 63/0861 |
| 2018/0167394 A1 | 6/2018 | High et al. | |
| 2018/0309581 A1 | 10/2018 | Butler et al. | |
| 2019/0103967 A1 | 4/2019 | Meng et al. | |

OTHER PUBLICATIONS

Zyskind et al., Decentralizing Privacy: Using Blockchain To Protect Personal Data, Security and Privacy Workshops (SPW), 2015 IEEE, Retrieved from Internet: URL: http://ieeexplore.ieee.org/document/7163223/?arnumber=7163223, pp. 180-184.

Herbert et al., A Novel Method for Decentralised Peer-To-Peer Software License Validation Using Cryptocurrency Blockchain Technology, Proceedings of the 38th Australasian Computer Science Conference (ACSC 2015), Sydney, Australia, Jan. 27-30, 2015, Retrieved from Internet: URL: http://crpit.com/confpapers/CRPITV159Herbert.pdf, pp. 27-35.

Linn et al., Blockchain for Health Data and Its Potential Use in Health It and Health Care Related Research, Retrieved from Internet: URL: https://www.healthit.gov/sites/default/files/11-74-ablockchainforhealthcare.pdf, pp. 1-10.

Office Action (dated Oct. 15, 2018) for U.S. Appl. No. 15/491,285, filed Apr. 19, 2017.

Amendment (dated Jan. 14, 2019) for U.S. Appl. No. 15/491,285, filed Apr. 19, 2017.

Final Office Action (dated Feb. 5, 2019) for U.S. Appl. No. 15/491,285, filed Apr. 19, 2017.

RCE/ amendment (dated Apr. 2, 2019) for U.S. Appl. No. 15/491,285, filed Apr. 19, 2017.

Notice of Allowance (dated Sep. 12, 2019) for U.S. Appl. No. 15/491,285, filed Apr. 19, 2017.

312 amendment (dated Oct. 23, 2019) for U.S. Appl. No. 15/491,285, filed Apr. 19, 2017.

* cited by examiner

DECENTRALIZED BIOMETRIC SIGNING OF DIGITAL CONTRACTS

This application is a continuation application claiming priority to Ser. No. 15/491,285, filed Apr. 19, 2017.

TECHNICAL FIELD

The present invention relates to biometric signing, and more specifically to decentralized biometric signing of digital contracts.

BACKGROUND

With the increasing use of smart contracts and digitization of commercial and personal agreements, it is becoming more and more desirable for users to be able to easily enter into legally binding contracts using mobile or other electronic devices. An interaction comprising certain legal features, such as an offer, acceptance, consideration and the like can be considered legally binding and therefore form a contract between two or more parties. Prior art approaches typically use a state, corporate or other actor to manage the contracting process and to allow peer to peer contracts to be formed between the parties in such a way that each party can, in the event of dispute, enforce the contract legally in conventional courts.

SUMMARY

Embodiments of the present invention provide a method, and associated computer system and computer program product, for decentralized biometric signing of a digital contract. One or more processors of the computer system create a digital identity comprising a private key. The private key was encrypted on a mobile device via use of captured biometric data. The one or more processors generate a digital hash of the digital contract. The one or more processors authenticate a user using biometric data. The one or more processors authorize usage of the biometric data. Responsive to the usage of the biometric data being authorized, the one or more processors decrypt the encrypted private key. The one or more processors sign the digital hash with the decrypted private key. The one or more processors store the signed digital hash in a blockchain.

BRIEF DESCRIPTION OF THE DRAWINGS

Embodiments of the present invention will now be described in more detail, by way of example only, with reference to the accompanying drawings.

DETAILED DESCRIPTION

Prior art biometric authentication has, primarily, been via the use of fingerprints. The use of thumb readers on iPhone® mobile phones and similar devices is an example of this biometric authentication, as are thumb readers used in immigration and border control systems around the world. Such systems mostly rely on the centralized storage of biometric data. Such centralized storage represents a security risk since the consolidated storage of large volumes of biometric data makes such a system an attractive target for hackers. Furthermore, the compromise of one such system may result in the compromise of all the biometric data.

Systems using biometric data are susceptible to replay attacks. For example, it is possible to record a face or voice and to use it to unlock a system that relies on this biometric data. Even thumbprints, as widely used as they are, can be copied.

A prior art approach to digital contracting is based on cryptographic signing of the hashes generated from the document, which uses public key cryptography where a hash is created using a message digest or similar and then this hash is signed using the private key of the signing party. A problem with this prior art approach is that it can be difficult to link the private key with a physical identity and the process of signing documents and managing keys may be very cumbersome for users who may not be familiar with public key cryptography.

Embodiments of the present invention allows a user to register a digital identity and then to use this digital identity to enter into digital contracts that may be legally enforced in a court. The embodiments are decentralized and do not rely on a central authority or government. Further, the embodiments of the present invention do not require a central biometrics database thus allowing users to retain ownership of the users' biometric data.

Figure 1:
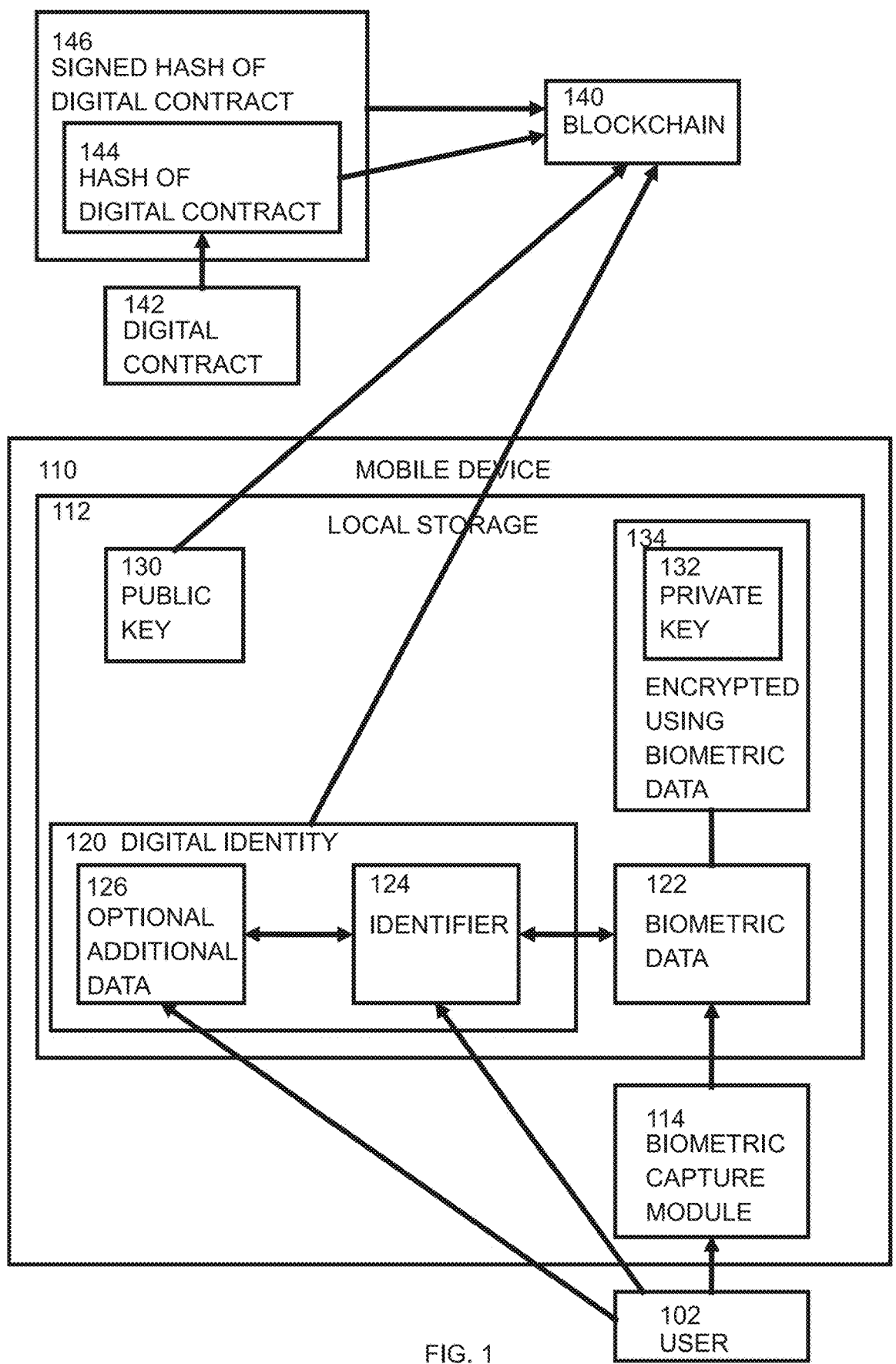
FIG. 1 is a block diagram of a system in which embodiments of the present invention may be implemented.

FIG. 1 is a block diagram of a system in which embodiments of the present invention may be implemented. User 102 uses mobile device 110 having local storage 112 and biometric capture module 114 to capture biometric data 122 associated with the user 102. The biometric data 122 may be encrypted or may not be encrypted. The user 102 provides an identifier 124 for a digital identity 120 and the captured biometric data 122 is associated with the identifier 124 on the mobile device 110. Optional additional data 126 may be provided by the user 102. This optional additional data 126 may include, for example, a certifier of the digital identity 120 such as a bank, telecommunications company or government organization. Although the embodiment above has been described using a mobile device 110, other embodiments using other devices are also possible. For example, a user 102 with a desktop computer may wish to enter into a digital contract with another user who has a mobile device. Any permutation or combination of mobile devices 110, desktop devices, laptops or any other data processing device for each user may be used in embodiments of the present invention. Although local storage 112 is depicted in FIG. 1 as being within mobile device 110 (e.g., for both convenience and for security), Embodiments of the invention may use removable local storage 112, such as flash memory cards, so long as the biometric data 122 is secured. Biometric capture module 114 may be any known means of capturing any form of biometric data 122 and may be integral with the mobile device 110 or may be separated from the mobile device 110 or from the desktop computer, laptop or other data processing device.

A public key 130 and private key 132 pair is generated. The private key 132 is encrypted, within the mobile device 110, using the biometric data 122 to produce an encrypted private key 134. The encryption is done within the mobile device 110 so that the biometric data 122 does not leave the mobile device. If a desktop computer, laptop or other data processing device is used, then this should ensure that the biometric data is appropriately secured, either within the device itself or within, for example, a trusted network. Optionally, the encrypted private key 134 may be further stored on additional mobile devices 110 belonging to, or used by, the same user 102. Further, additional desktop computers, laptops or other data processing devices belonging to, or used by, the same user may also store the encrypted private key 134. An advantage for the user 102 is that the biometric data 122 remains within control of the user 102. The digital identity 120 and the public key 130 are written to a blockchain 140. The blockchain 140 is a prior art peer to peer distributed database that maintains a continuously growing list of records called blocks. Each block contains a timestamp and a link to a previous block, with data contained in the block not being able to be altered retrospectively. The blockchain 140 provides a secure database that does not require a trusted administrator. The information contained within the blockchain 140 may be public or private. The information contained within the blockchain 140 enables parties who wish to contract with the user 102 to "locate" the information.

If user 102 wishes to enter into a digital contract 142 with one or more other parties, then a digital hash 144 of the digital contract 142 is generated. The user 102 is authenticated on the mobile device 110 using the biometric capture module 114. The authentication may be done on a desktop computer, laptop or other data processing device, so long as the desktop computer, laptop or other data processing device includes or is attached to a biometric capture module 114. Responsive to the user 102 being authenticated, the encrypted private key 134 is decrypted using the biometric data 122, and the hash of the digital contract 144 is signed with the user's private key 132 to produce the signed hash of the digital contract 146. The signed hash of the digital contract 146 is then stored in the blockchain 140. Optionally, the digital contract 142 itself may also be stored in the blockchain 140, or a link to the digital contract 142 may be stored in the blockchain 140.

Figure 2:
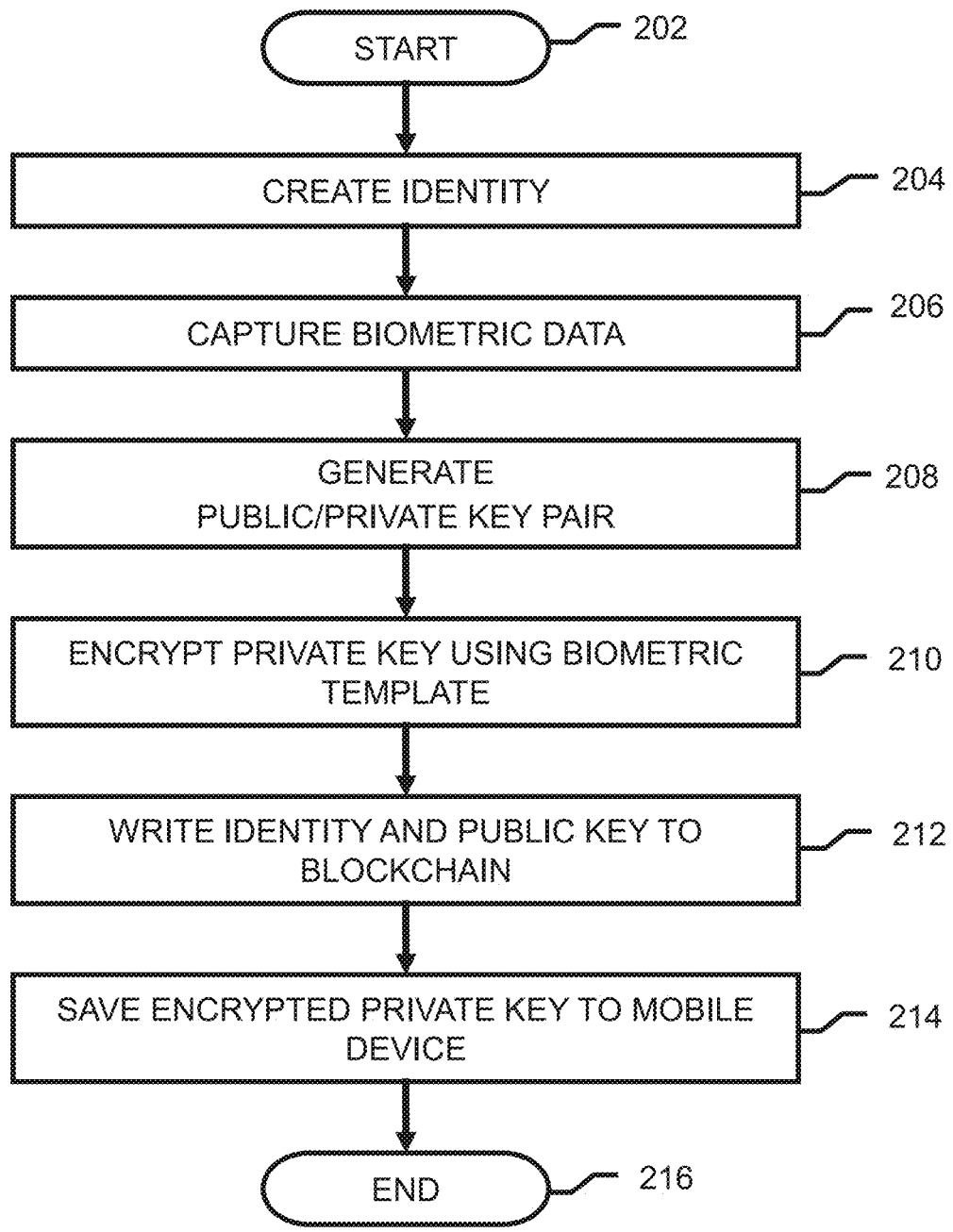
FIG. 2 is a flowchart of a computer-implemented method for creating a digital identity according to an embodiment of the present invention.

FIG. 2 is a flowchart of a computer-implemented method for creating a digital identity according to an embodiment of the present invention. The digital identity may be for use in decentralized biometric signing of digital contracts according to another embodiment of the present invention. The computer-implemented method starts at step 202. At step 204, a digital identity 120 is created by the user 102. Multiple digital identities 120 may be created on a single mobile device 110 representing entities, namely different domains, personas or aspects of the user's 102 life. For example, the user 102 may require the ability to sign digital contracts 142 on behalf of the entities or on behalf of a company with which the entities are associated. Some digital identities 120 may be created for single use or throw-away purposes such as for making a purchase or signing up to a web service. Multiple digital identities 120 may be linked to a single set of biometric data 122. Because the biometric data 122 is not used directly to digitally sign files, different digital identities 120 may be created, and subsequently revoked or destroyed, for different purposes, while, in all cases, being linked back to the same biometric data 122 so that, in the event of a dispute, it is possible to prove participation or agreement. Other digital identities 120 may require a high degree of certification, such as when transacting with a financial institution, government organization or similar institution or organization.

A single digital identity 120 may be stored on more than one mobile devices 110, typically being mobile devices 110 which are used by, or under the control of, a single user 102. In an embodiment, a single digital identity 120 may belong to a company or organization and copies of the single digital identity 120 may be stored on multiple mobile devices 110 associated with the company or organization. As there is no central authority or agency involved in the creation of a digital identity, any person can create the person's own digital identity, which will be linked to the person's own biometric data 122.

Figure 3:
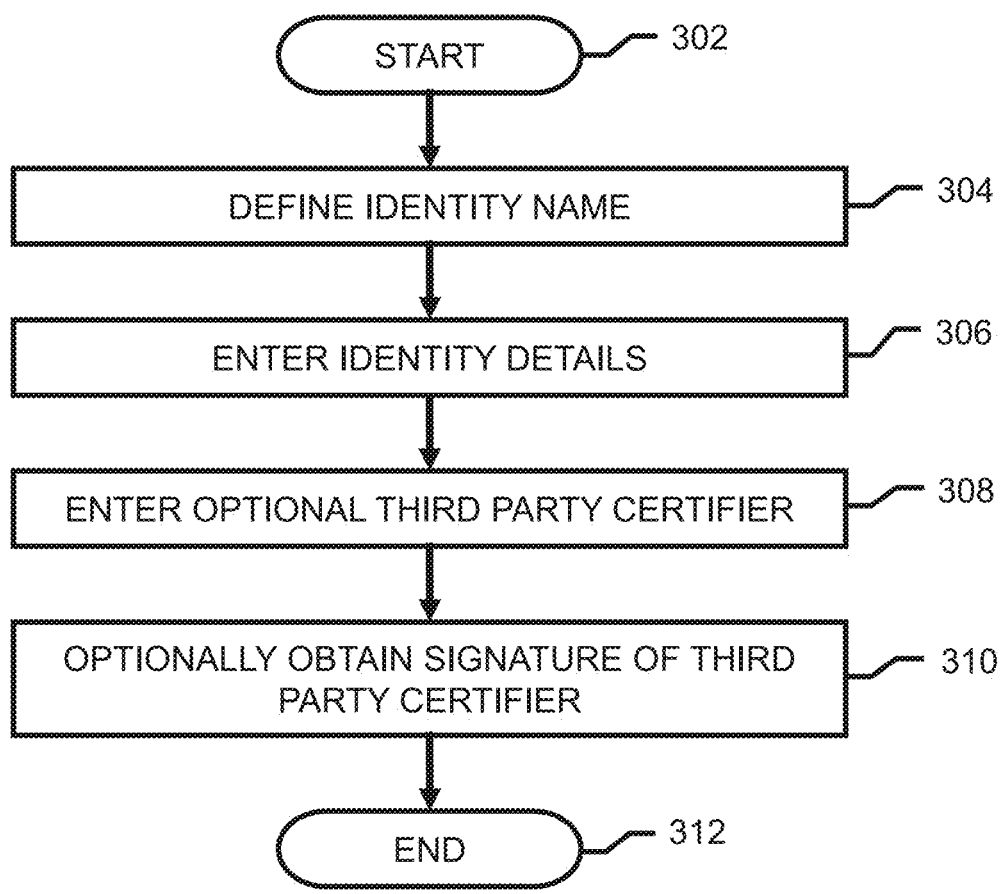
FIG. 3 is a flowchart showing, in detail, the step in FIG. 2 of creating an identity, according to an embodiment of the present invention.

FIG. 3 is a flowchart showing, in detail, step 204 of FIG. 2 of creating an identity, according to an embodiment of the present invention. The computer-implemented method starts at step 302. At step 304, the user 102 defines the name of the digital identity 120 to be created. At step 306, the user provides some details of the digital identity 120. The details may, for example, include the user's 102 name, email address and any other information that the user 102 may choose to disclose. The details may include the name of a company or organization that the user 102 is associated with instead of, or in addition to, the user's name. At step 308, optionally, the user 102 may indicate that the digital identity 120 should be linked and validated to the user's 102 real-life persona, which may involve a government, telecommunications company, bank, social media network or other entity as a certifying authority. In some embodiments, digital identities 120 may be created by the user 102 without any third party validation. If, at step 308, the user indicates that the digital identity 120 should be linked and validated to the user's 102 real-life persona. Then at step 310, the digital signature of a third party certifier is obtained. If the certifying authority is a social network, then the certification could be provided by another user of that social network. The computer-implemented method ends at step 312.

Returning to FIG. 2, at step 206, biometric data 122 associated with the user 102 is captured by biometric capture module 114 in the mobile device 110. Biometric data 122 may be, for example, data captured using a fingerprint reader, data captured based on voice patterns, data captured based on face patterns, retina scans or other forms of identification. Capture of the biometric data 122 may be done within the mobile device 110 so that the biometric data 122 does not leave the mobile device. Capture of the biometric data 122 may be done using a biometric capture module 114 which is separate from the mobile device 110. If the capture of the biometric data 122 is done, or if a desktop computer, laptop or other data processing device is used, then there is assurance that the biometric data is appropriately secured, either within the device itself or within a trusted network.

Figure 4:
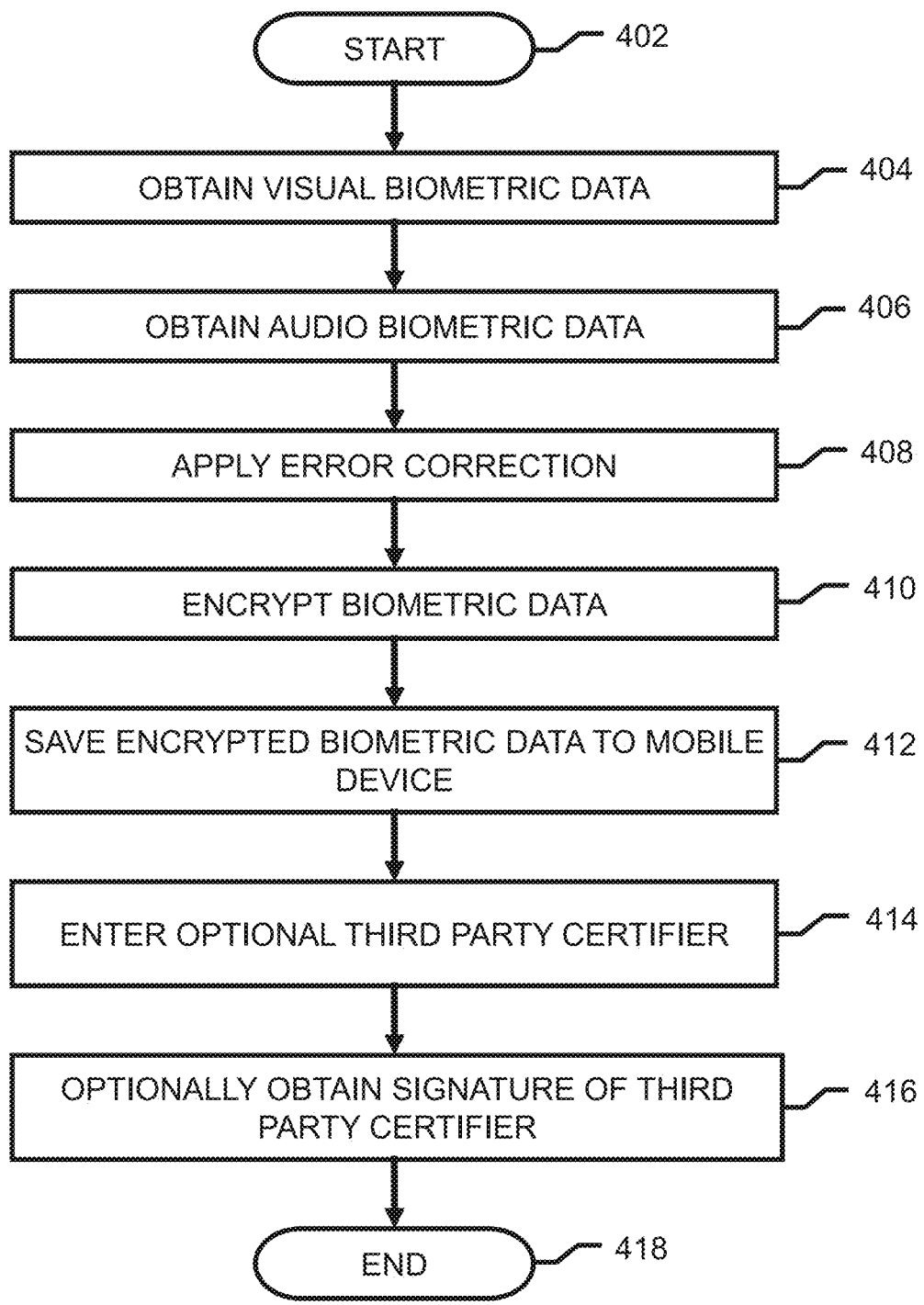
FIG. 4 is a flowchart showing, in detail, the step in FIG. 2 of capturing biometric data from a user, according to an embodiment of the present invention.

FIG. 4 is a flowchart showing, in detail, step 206 of FIG. 2 of capturing biometric data 122 from the user 102 according to an embodiment of the present invention. The computer-implemented method starts at step 402. In an embodiment, the biometric data 122 captured is based on two biometric elements, face and voice. The user 102 is asked to look into a camera associated with the user's mobile device 110 or other capture device and to read some sentences that are displayed. The captured data is split, at step 404, into a video data stream and, at step 406, into an audio data stream. In another embodiment, the video data stream and the audio data stream may be captured separately. At step 408, each data stream of the video data stream and the audio data stream is passed through an error correction algorithm that deals with variations that typically occur with different biometric samples. Examples of the variations include that people speak differently due to environmental, physiological factors or other factors at different points in time. The error correction algorithm produces biometric data 122 for face and voice. The error correction algorithm may require further captures of data to improve the algorithm's quality and/or may modify the captured data such that successive data captures will better match. At step 410, optionally, the biometric data 122 is encrypted. At step 412, the encrypted biometric data 122 is saved to the mobile device 110. An advantage of saving, rather than publishing externally, the encrypted biometric data 122 to the mobile device 110 is that the central storage of biometric data 122 is a major security risk and a major shortcoming of current biometric technologies. As mentioned above, the biometric data 122 may be saved elsewhere so long as it can be ensured that the biometric data 122 is appropriately secured, either within the mobile device 110 itself or within a trusted network.

At step 414, the user 102 is given the option of external certification or validation of the biometric data 122. The user 102 is able to nominate one or more telecommunications companies, government agencies, banks, social media network, or any other third parties to certify the validity of the biometric data 122. For example, in the case of social network, the biometric capture will be shared with participants in a network and the participants will be asked to vouch for, that is, sign, the identity of the biometric data 122. For example, a person certified by one or more mutual friends in a social network would give more confidence than if the person had been self-certified.

In the case of a telecommunications company, a link between the mobile device 110, a SIM card from the mobile device 110 and the user's 102 personal identity may be used for certification. This link may have originated from a time when a SIM is provided to the user 102, when the user 102 will possibly be present physically at a store associated with the telecommunications company. The link may be through the use of a comparison of biometric data 122 captured on the device and biometric data that the telecommunications company has captured through the use of either the telecommunications company's own biometric authentication technology or through biometric-analysis of the user's 102 own recorded interaction with a telecommunications company call center.

This certification is recorded as information so that, in the future, a contracting counter-party will be able to determine whether the person the contracting counter-party is dealing with has been certified and, if so, by whom or by what. This information will help the contracting counter-party make decisions concerning the risk associated with a transaction and factor this risk into pricing or contracting terms.

At step 416, in an example of a telecommunications company certifying the biometric data, a hash of the captured biometric data 122 is sent to the telecommunications company and the telecommunications company compares the received biometric data with the hash of an already existing template, based on call center interactions or similar interactions. If the hash of the received biometric data 122 matches the existing template, then the biometric data 122 would be considered authenticated. It is also possible that the user 102 may present physically to a telecommunications company store or outlet, proof of the identity of the user 102 using ID and then have the user 102's biometric data 122 signed. A further variation uses a remote chat session between the telecommunications company and the user 102 in which the audio and video is captured and authenticated remotely, using a similar form of multifactor authentication similar to that described above. The computer-implemented method ends at step 418.

Returning to FIG. 2, at step 208, a public key 130 and private key 132 pair are generated. If, at steps 308 and 310 of FIG. 3, a third party who provides a Certification Authority was selected when the identity was created, then the public key 130 and private key 132 pair may be generated by the Certification Authority, such as a telecommunications company or government organization. Otherwise, the public key 130 and private key 132 pair may be generated by the mobile device 110 itself. In an embodiment, even if a third party who provides a Certification Authority was selected when the identity was created, the public key 130 and private key 132 pair may nevertheless be generated by the mobile device 110 itself. I one embodiment, the Certification Authority generates the public key 130 and private key 132 pair because that is more authoritative for potential parties with whom the user 102 may wish to enter into a digital contract 142 with.

At step 210, the private key 132 is encrypted by the mobile device 110 utilizing the captured biometric data 122. Due to carrying out step 210 on the mobile device 110, neither the private key 132, nor the biometric data 122, needs to leave the mobile device 110 and thus the risk to compromise of the biometric data 122 or the private key 132 is reduced. The private key 132 can be decrypted only by using the biometric data 122 stored in the mobile device 110, which can itself only be done by someone using the same voice and face print to access the mobile device 110 as was used to create the biometric data 122. In order for a hacker to compromise the entire biometric system, the hacker would need to attack a myriad of disparate user 102 mobile devices 110, which would be difficult. This would be even more difficult if HCE or the Secure Element on the SIM in the mobile device 110 is used.

At step 212, the digital identity 120 and the public key 130 are written to a blockchain 140. Any other optional additional data 126 within the digital identity 120 may also be written to the blockchain 140. This optional additional data 126 may include, for example, the certifier of the identity 124 such as a bank, telecommunications company or government organization. By writing this optional additional data 126 to the blockchain 140, the party that the user 102 contracts with is able to quickly determine the identifier 124 associated with the user 102 and the degree to which the party can be confident in the identifier 124 based on the credibility of the certifying authority. If a third party has certified the biometric data 122, then this certification of the public key 130 may be stored alongside the public key 130 and digital identity 120 information in the blockchain 140. For example, if the biometric data 122 was certified by the social network of the user 102, then the participants in that network who vouched for the identity may be stored along with the digital signatures of the participants.

At step 214, the encrypted 134 private key 132 is saved to the mobile device 110. In an embodiment, the encrypted 134 private key 132 may be synchronized with other mobile devices 110 owned by, or used by, the same user 102 such that each of the mobile devices 110 may be used to enter into digital contracts 142. In an embodiment, the encrypted 134 private key 132 may be synchronized with other mobile devices 110 owned by, or used by, a company or organization which is associated with the encrypted 134 private key 132. The storage of the encrypted 134 private key 132 may be in a Secure Element or may use Host Card Emulation (HCE) to prevent tampering or extraction. The computer-implemented method ends at step 216.

Figure 5:
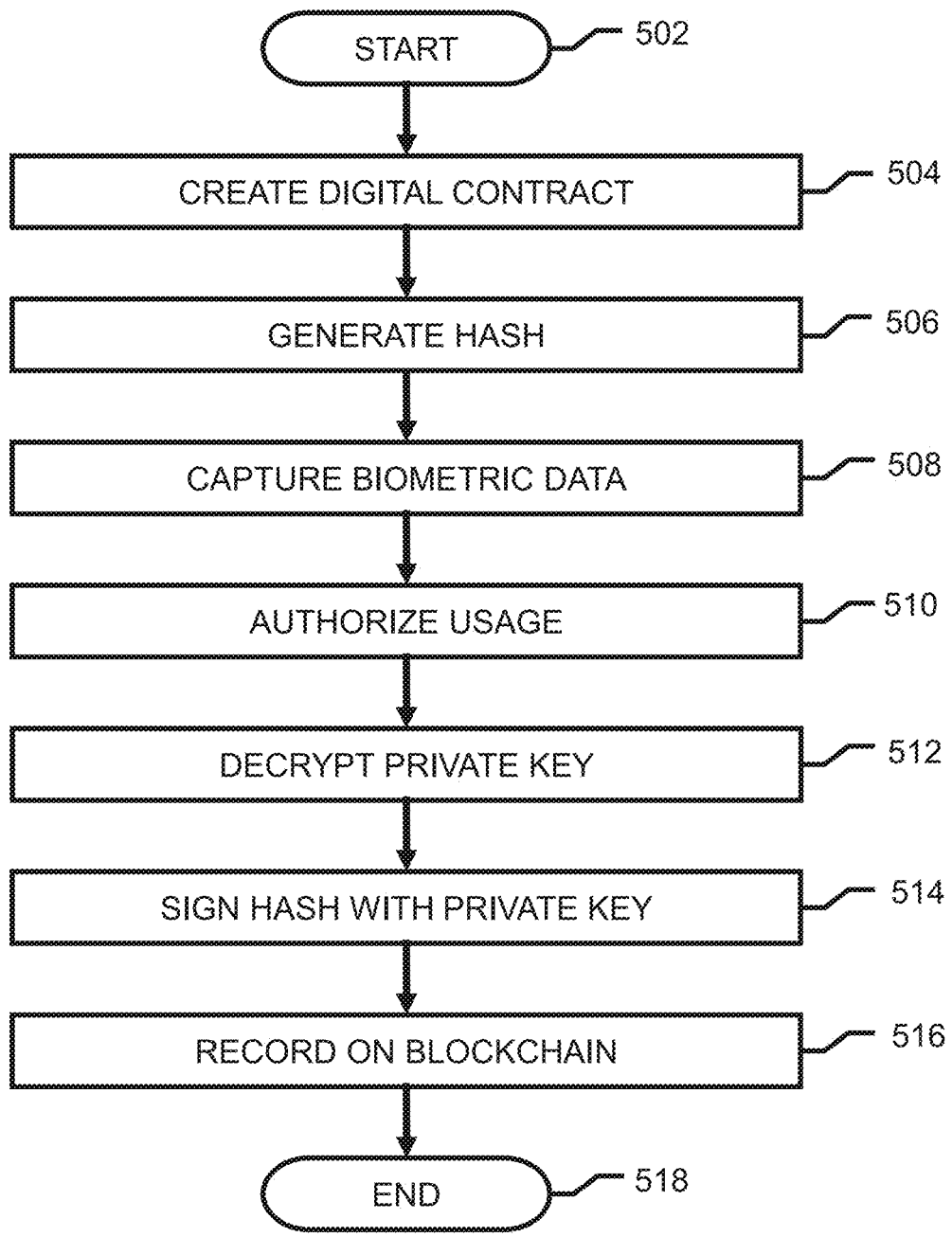
FIG. 5 is a flowchart of a computer-implemented method for decentralized biometric signing of digital contracts according to an embodiment of the present invention.

FIG. 5 is a flowchart of a computer-implemented method for decentralized biometric signing of digital contracts according to an embodiment of the present invention. Prior to a user being able to sign a digital contract according to an embodiment of the present invention, i a digital identity 120 may be created using the computer-implemented method described above with reference to FIGS. 2 to 4.

The computer-implemented method starts at step 502. At step 504, a digital contract 142 is created. It does not matter how the digital contract 142 is created so long as the contract can be represented digitally. In embodiments, the digital contract may be created by the user 102 taking a photograph of a written contract using the mobile device 110, the digital contract 142 may be written as a smart contract using code, or the digital contract 142 may be retrieved from a library of digital contracts 142 and customized according to the needs of the user 102 and other parties to the digital contract 142. Another user 102 may make an offer via a digital channel so as to provide the user 102 of the mobile device 110 with a set of contract terms. The user reviews the set of contract terms and agrees to the terms of the digital contract 142. The user 102 agrees, or accepts, the terms of the digital contract 142 by taking the scanned contract or smart contract code and digitally signing the digital contract 142 to indicate acceptance. The digital signing process is described below with reference to steps 506 to 514.

At step 506, a digital hash 144 of the digital contract 142 is generated. Any hash algorithm may be used to generate the digital hash 144. Examples of such hash algorithms include MD5, SHA-1 and SHA-2. In particular, the SHA256 variant of SHA-2 may be used. MD5 and SHA-1 suffer from vulnerabilities and are thus less preferable. The hash algorithm generates an alphanumeric string that represents the digital contract 142. Characteristics of digital hashes include (i) a small change to the digital contract 142 changes the digital contract 142's hash so extensively that the new hash value appears uncorrelated with the old hash value and (ii) no two digital contracts 142 will ever have the same hash value. Because of these characteristics, a digital hash can be used to prove that there has not been any tampering with the digital contract 142 and the digital hash can be used, for the purposes of this decentralized biometric signing algorithm, as a proxy for the actual digital contract 142 document.

At step 508, biometric data 122 is captured so as to enable the user 102 to be authenticated.

Figure 6:
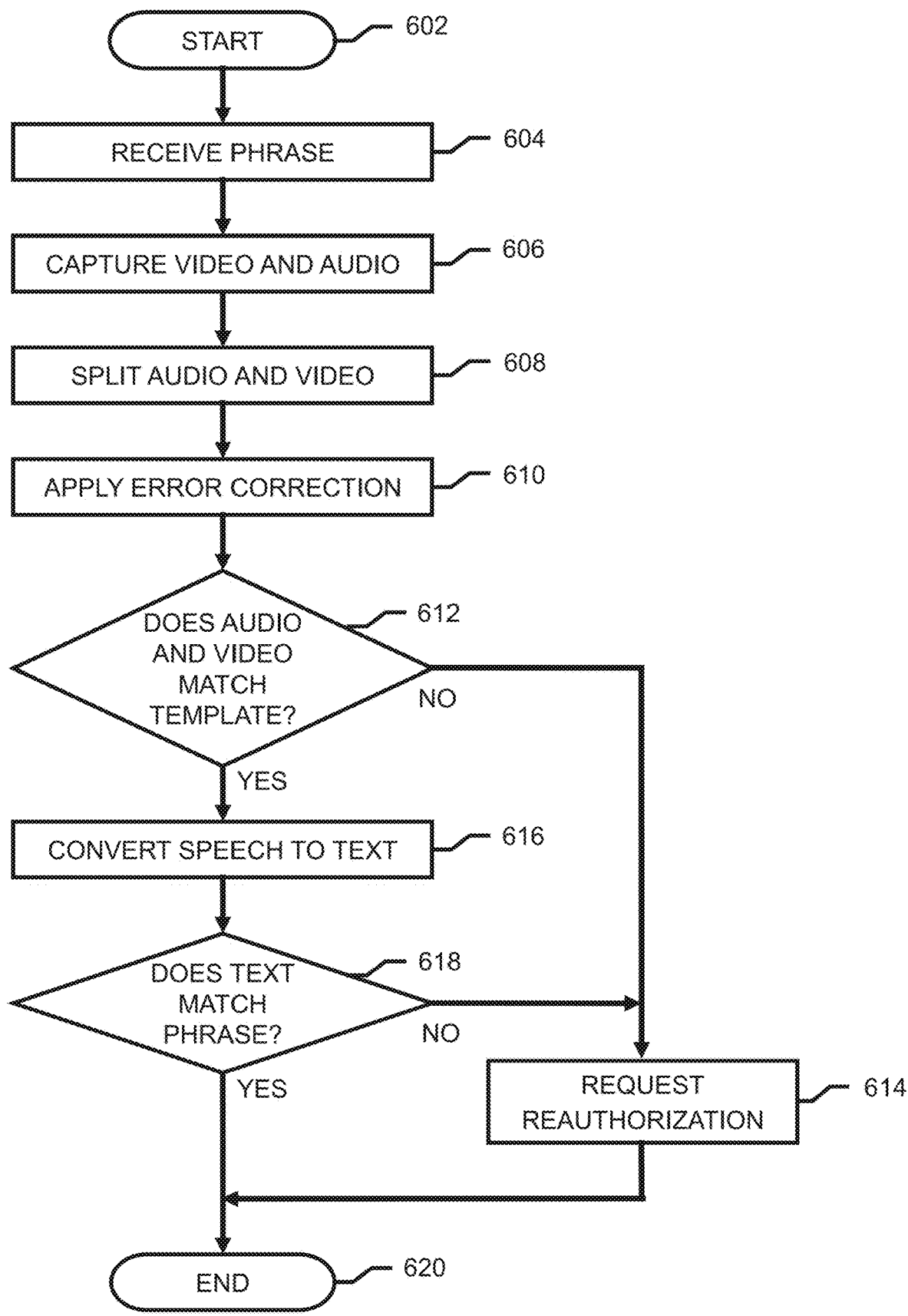
FIG. 6 is a flowchart showing, in detail, the steps in FIG. 5 of capturing biometric data from the user and authorizing usage of the biometric data, according to an embodiment of the present invention.

FIG. 6 is a flowchart showing, in detail, step 508 of FIG. 5 of capturing biometric data 122 from the user 102, and authorizing usage of the biometric data, according to an embodiment of the present invention. The computer-implemented method starts at step 602. When biometric data 122 is used, there is a risk that the biometric data 122 can be spoofed if another user has a recording of a face and a voice. In embodiments of the present invention, this risk is mitigated by requiring the user 102 to speak a random phrase and, in addition to carrying out a check of the spoken phrase against biometric data 122, checking that the correct phrase was spoken and thus removing the possibility of the phrase having been previously recorded.

At step 604, a phrase is received by a user 102. The phrase is either randomly generated, provided by the counter-party to the digital contract 142, or produced by some other service, which has an advantage of mitigating the risk of a third party replaying the biometric data 122 which is a major shortcoming in most current biometric solutions. The user 102 is asked to look into the camera associated with the user 102's mobile device 110 and to read the received phrase into a microphone associated with the user 102's mobile device 110. The associated camera and microphone may be integral with the mobile device 110 or separated from the mobile device 110. Typically, use of the randomly generated phrase is time-limited. At step 606, the video and audio data is captured. At step 608, the captured video and audio data is split into two separate files or into two separate streams. At step 610, these two separate files or streams have error correction applied, similar to the error correction that was used when the biometric data 122 was created.

Authentication can also be via a web application such as a web application using webRTC protocol. An embodiment using webRTC protocol has an advantage of being usable with many different browsers, such as, for example, Microsoft® Edge, Google Chrome™, Mozilla® Firefox® and Opera™. Users 102 may want to enter into digital contracts 142 using different mobile devices 110 and use of a webRTC protocol allows this authentication by allowing a web browser to access a camera and a microphone associated with a mobile device 110 and to capture media from the users 102.

A risk associated with the use of biometric data is that biometric data can be spoofed if someone can record the face and the voice associated with the biometric data. To mitigate this spoofing, it may be required that the user speak a random phrase and, in addition to creating a biometric pattern, embodiments of the present invention may also perform speech to text recognition on the spoken word to ensure that the user 102 is saying the right phrase, thus mitigating the risk of the captured biometric data being recorded previously.

Returning to FIG. 5, at step 510, the usage of the biometric data is authorized. Referring now to FIG. 6, and in particular steps 612 to 620 of FIG. 6, which is a flowchart showing step 510 of FIG. 5 of authorizing usage in more detail.

At step 612, a check is made as to whether the audio and video files or streams captured in step 606 match the biometric data 122 previously obtained in step 206 of FIG. 2 and, in one embodiment, saved to the mobile device 110. The match is typically a comparison of a difference or differences between biometric data in the audio and video files or streams captured in step 606 and the biometric data 122 against a threshold so as to determine whether there is a match. If there is not a match, then processing proceeds to step 614. At step 614, a request is made for reauthorization, where the user 102 is asked to try again. Typically, the reauthorization will be tried a finite number of times before it is decided that the biometric data 122 does not correspond to that of the user. The computer-implemented method ends at step 620. If there is a match, processing proceeds to step 616.

At step 616, speech in the audio stream or file is converted to text. At step 618, a check is made as to whether the text extracted from the speech matches the phrase that was sent to the user at step 604. If there is not a match, then processing proceeds to step 614, as described above. If there is a match, the computer-implemented method ends at step 620 and processing proceeds to step 512 of FIG. 5. If there is a match, then the match confirms that there has not been a replay attack, as the user 102 will not have known what the phrase was until the phrase was received.

Returning to FIG. 5, at step 512, responsive to the match and hence to usage being authorized, the encrypted 134 private key 132 on the mobile device 110 is decrypted using the biometric data 122. At step 514, the hash of the digital contract 144 is signed with the decrypted private key 132. At step 516, detailed information comprising the signed hash of the digital contract 146 and any other identification information is written to the blockchain 140. A record of the successful authentication using biometric data 122 may also be written to the blockchain 140 as part of the transaction. At any point in the future, the signature by the user 102 can be proven by retrieving the detailed information from the blockchain 140 and using the user's 102 public key 130 to validate that the digital hash was signed using the user's 102 private key 132. Further, it can be proved that biometric data 122 was used to decrypt the private key 132 and hence the digital contract 142 can be linked, via the digital identity 120, to the user's 102 physical identity. The computer-implemented method ends at step 518.

In another embodiment, the computer-implemented methods described above may be used for authentication of e-commerce transactions and thus extend beyond peer to peer digital contract 142 signings. In this embodiment, a user 102 accesses a web site and on checkout, the user 102 receives a message via a local app or via a chat channel, such as, for example, Whatsapp or similar, to authenticate by reading a phrase into a camera associated with the mobile device 110. A process similar to that described above is then executed and the record of the purchase from the web site is signed and stored accordingly.

Figure 7:
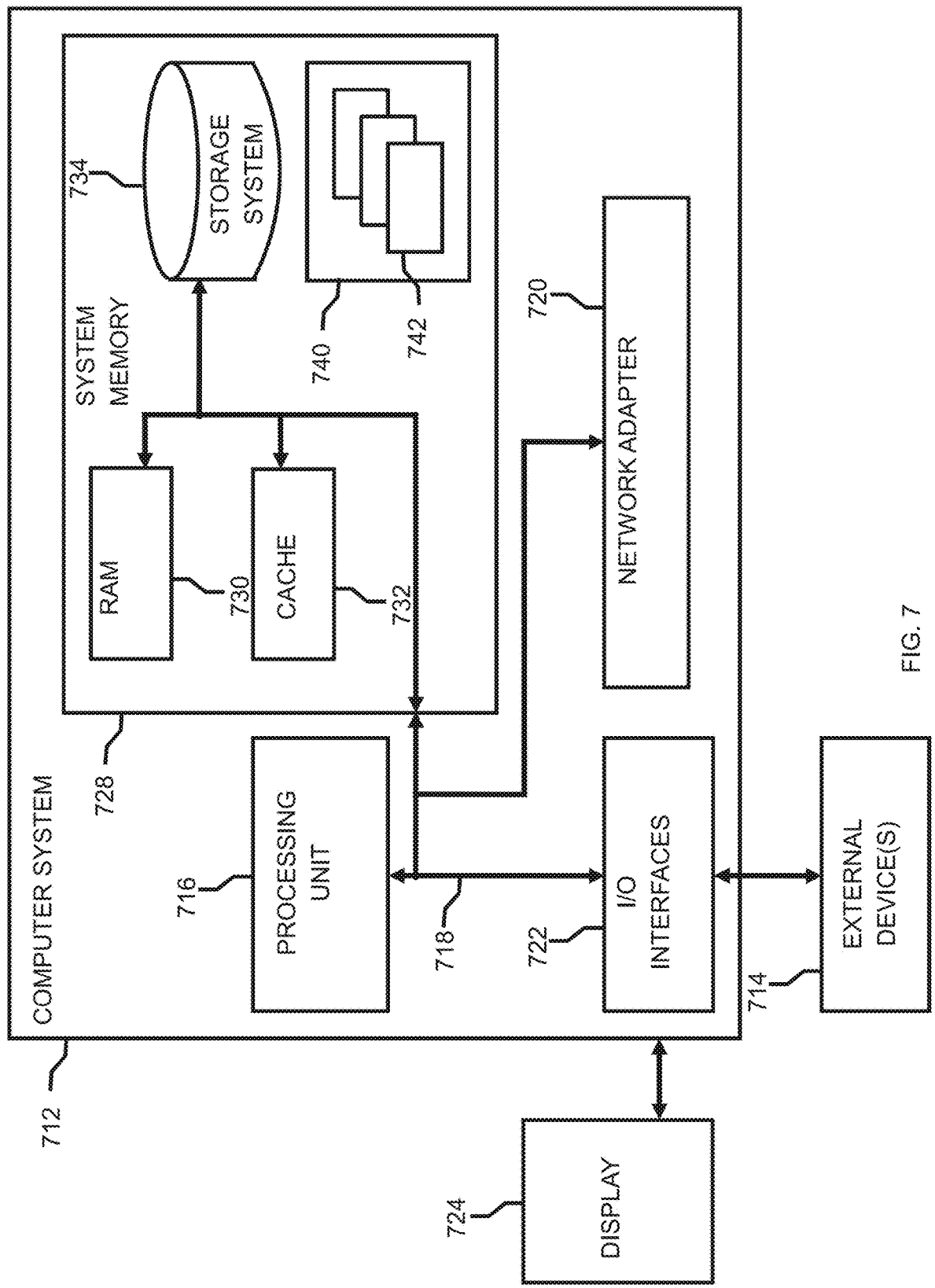
FIG. 7 is a block diagram of a computer system in which embodiments of the present invention may be utilized.

FIG. 7 is a block diagram of a computer system in which embodiments of the present invention may be utilized. Computer system 712 is only one example of a suitable computing system and is not intended to suggest any limitation as to the scope of use or functionality of embodiments of the invention described herein. Regardless, computer system 712 is capable of being implemented and/or performing any of the functionality set forth hereinabove.

Computer system/server 712 is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for decentralized biometric signing of a digital contract, said method comprising:
   encrypting, by one or more processors, a private key using biometric data captured, from a user, on a mobile device;
   storing, on the mobile device by the one or more processors, the encrypted private key, a public key associated with the private key, and a digital identity comprising (i) an identifier associated with the user and the captured biometric data and (ii) a certifier of the identifier;
   generating, by the one or more processors, a digital hash of the digital contract;
   authenticating, by the one or more processors, the user using the captured biometric data;
   authorizing, by the one or more processors, usage of the captured biometric data;
   responsive to the usage of the captured biometric data being authorized, decrypting, by the one or more processors using the captured biometric data, the encrypted private key;
   signing, by the one or more processors, the digital hash with the decrypted private key, which produces a signed digital hash of the digital contract; and
   storing in a blockchain, by the one or more processors, the signed digital hash of the digital contract, the digital contract prior to being hashed, the identifier, the certifier of the identifier, the public key, a certification of the public key by a third party, and a record of a successful authentication of the user using the biometric data.

2. The method of claim 1, wherein the digital contract comprises a smart contract using code.

3. The method of claim 1, wherein digital contract comprises a customized digital contract retrieved from a library of digital contracts.

4. The method of claim 1, wherein said capturing biometric data comprises capturing audio and video biometric data of the user speaking a textual phrase, wherein said authorizing usage of the captured biometric data comprises:
   comparing the captured biometric data with a template stored on the mobile device;
   responsive to a determination that the captured biometric data matches the template, converting the captured audio biometric data to text; and
   responsive to a determination that the text matches the textual phrase, authorizing usage of the captured biometric data.

5. The method of claim 1, wherein a plurality of digital identities are associated with a single biometric datum of the captured biometric data.

6. The method of claim 1, wherein said capturing biometric data comprises:
   capturing visual biometric data and audio biometric data; and
   applying error correction to the captured visual biometric data and audio biometric data.

7. The method of claim 1, wherein the certifier of the identifier is a bank, a telecommunications company, or a government organization.

8. A computer program product, comprising one or more computer readable hardware storage devices having computer readable program code stored therein, each hardware storage device not being a transitory signal, said program code containing instructions executable by one or more processors of a computer system to implement a method for
   encrypting, by the one or more processors, a private key using biometric data captured, from a user, on a mobile device;
   storing, on the mobile device by the one or more processors, the encrypted private key, a public key associated with the private key, and a digital identity comprising (i) an identifier associated with the user and the captured biometric data and (ii) a certifier of the identifier;
   generating, by the one or more processors, a digital hash of the digital contract;
   authenticating, by the one or more processors, the user using the captured biometric data;
   authorizing, by the one or more processors, usage of the captured biometric data;
   responsive to the usage of the captured biometric data being authorized, decrypting, by the one or more processors using the captured biometric data, the encrypted private key;
   signing, by the one or more processors, the digital hash with the decrypted private key, which produces a signed digital hash of the digital contract; and
   storing in a blockchain, by the one or more processors, the signed digital hash of the digital contract, the digital contract prior to being hashed, the identifier, the certifier of the identifier, the public key, a certification of the public key by a third party, and a record of a successful authentication of the user using the biometric data.

9. The computer program product of claim 8, wherein the digital contract comprises a smart contract using code.

10. The computer program product of claim 8, wherein digital contract comprises a customized digital contract retrieved from a library of digital contracts.

11. The computer program product of claim 8, wherein said capturing biometric data comprises capturing audio and video biometric data of the user speaking a textual phrase, wherein said authorizing usage of the captured biometric data comprises:
   comparing the captured biometric data with a template stored on the mobile device;
   responsive to a determination that the captured biometric data matches the template, converting the captured audio biometric data to text; and
   responsive to a determination that the text matches the textual phrase, authorizing usage of the captured biometric data.

12. The computer program product of claim 8, wherein a plurality of digital identities are associated with a single biometric datum of the captured biometric data.

13. The computer program product of claim 8, wherein said capturing biometric data comprises:
   capturing visual biometric data and audio biometric data; and
   applying error correction to the captured visual biometric data and audio biometric data.

14. The computer program product of claim 8, wherein the certifier of the identifier is a bank, a telecommunications company, or a government organization.

15. A computer system, comprising one or more processors, one or more memories, and one or more computer readable hardware storage devices, said one or more hardware storage device storing program code executable by the one or more processors using the one or more memories to implement a method for decentralized biometric signing of a digital contract, said method comprising:
   encrypting, by the one or more processors, a private key using biometric data captured, from a user, on a mobile device;
   storing, on the mobile device by the one or more processors, the encrypted private key, a public key associated with the private key, and a digital identity comprising (i) an identifier associated with the user and the captured biometric data and (ii) a certifier of the identifier;
   generating, by the one or more processors, a digital hash of the digital contract;
   authenticating, by the one or more processors, the user using the captured biometric data;
   authorizing, by the one or more processors, usage of the captured biometric data;
   responsive to the usage of the captured biometric data being authorized, decrypting, by the one or more processors using the captured biometric data, the encrypted private key;
   signing, by the one or more processors, the digital hash with the decrypted private key, which produces a signed digital hash of the digital contract; and
   storing in a blockchain, by the one or more processors, the signed digital hash of the digital contract, the digital contract prior to being hashed, the identifier, the certifier of the identifier, the public key, a certification of the public key by a third party, and a record of a successful authentication of the user using the biometric data.

16. The computer system of claim 15, wherein the digital contract comprises a smart contract using code.

17. The computer system of claim 15, wherein digital contract comprises a customized digital contract retrieved from a library of digital contracts.

18. The computer system of claim 15, wherein said capturing biometric data comprises capturing audio and video biometric data of the user speaking a textual phrase, wherein said authorizing usage of the captured biometric data comprises:
   comparing the captured biometric data with a template stored on the mobile device;
   responsive to a determination that the captured biometric data matches the template, converting the captured audio biometric data to text; and
   responsive to a determination that the text matches the textual phrase, authorizing usage of the captured biometric data.

19. The computer system of claim 15, wherein a plurality of digital identities are associated with a single biometric datum of the captured biometric data.

20. The computer system of claim 15, wherein said capturing biometric data comprises:
   capturing visual biometric data and audio biometric data; and
   applying error correction to the captured visual biometric data and audio biometric data.

* * * * *